United States Patent
Petersen

(10) Patent No.: US 7,088,966 B2
(45) Date of Patent: Aug. 8, 2006

(54) WIRELESS CONNECTION CONTROLLER

(75) Inventor: Carl R. Petersen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 957 days.

(21) Appl. No.: 10/021,659

(22) Filed: Dec. 7, 2001

(65) Prior Publication Data

US 2003/0108009 A1   Jun. 12, 2003

(51) Int. Cl.
H04B 17/00   (2006.01)

(52) U.S. Cl. .............................. 455/115.3; 455/115.1; 455/226.1

(58) Field of Classification Search ........ 455/436–439, 455/442; 370/331–333
See application file for complete search history.

(56) References Cited

U.S. PATENT DOCUMENTS

| | | | | |
|---|---|---|---|---|
| 5,203,011 A | * | 4/1993 | Bane et al. | 455/510 |
| 5,239,667 A | * | 8/1993 | Kanai | 455/10 |
| 5,450,473 A | * | 9/1995 | Shiotsuki et al. | 455/441 |
| 5,987,326 A | * | 11/1999 | Tiedemann et al. | 455/442 |
| 6,026,296 A | * | 2/2000 | Sanders et al. | 455/426.1 |
| 6,148,194 A | * | 11/2000 | Kao et al. | 455/421 |
| 6,317,600 B1 | * | 11/2001 | Salonaho et al. | 455/453 |
| 6,421,538 B1 | * | 7/2002 | Byrne | 455/441 |
| 6,711,408 B1 | * | 3/2004 | Raith | 455/440 |
| 6,934,315 B1 | * | 8/2005 | Suwa | 375/132 |

OTHER PUBLICATIONS

Quinn, Liam B. and Alan Eric Sicher, U.S. Patent Application entitled, "Wireless Antenna Switching System," U.S. Appl. No. 09/768,072, filed Jan. 23, 2001.

Watts, Jr., La Vaughn F. and Erica Scholder, U.S. Patent Application entitled "Wireless Communication Apparatus," U.S. Appl. No. 09/491,485, filed Jan. 23, 2001.

Watts, Jr., La Vaughn F. and Erica Scholder, U.S. Patent Application entitled "Wireless Communication Apparatus," U.S. Appl. No. 09/492,030, filed Jan. 23, 2001.

* cited by examiner

Primary Examiner—CongVan Tran
(74) Attorney, Agent, or Firm—Haynes and Boone, LLP

(57) ABSTRACT

A method and system for establishing connection between two wireless devices. The method and system includes establishing connection authentication between the wireless devices, and measuring and the signal strength between the two devices. Predetermined values related to signal strength and signal rate change are established, and connection is allowed if the values are met.

16 Claims, 3 Drawing Sheets

WIRELESS CONNECTION CONTROLLER

BACKGROUND OF THE INVENTION

1. Field of the Invention

This invention relates to wireless devices, in particular to a method and system to discriminate connection between wireless devices avoiding needless interruption to a user.

2. Description of the Related Art

Information handling systems in general have attained widespread use in business as well as personal computing environments. An information handling system, as referred to herein, may be defined as an instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes. The information handling system may be configured for a specific user application or requirement such as financial transaction processing, airline reservations, enterprise data storage and/or global communications. In general, an information handling system may include a variety of hardware and/or software components that may be configured to provide information and/or consume information. An information handling system may include one or more computer systems, data storage systems, and/or networking systems.

Information handling systems such as personal computers (PC) have traditionally relied on wired connections to communicate to other PCs; computers such as servers; personal digital assistants (PDA); and peripherals such as printers, scanners, and Internet cameras.

Infrared and wireless technologies have provided the ability for PCs to wirelessly connect to peripherals and to one another. This type of connection facilitates communication over limited distances with a considerable exchange of information and data. As used in the present disclosure, the term "connection" is generally defined to include point-to-point connections and network connections.

Through industry-sponsored specifications, direct wireless communication links between PCs, computers, peripherals, and other devices have evolved into structured and controlled communication. Industry specifications include the Institute of Electronics and Electrical Engineering (IEEE) 802.11 standards and related derivatives (e.g., 802.11(a) and 802.11(b)). Another popular and related wireless communication specification is the Bluetooth™ standard developed and supported by the Bluetooth™ consortium. Generally, these specifications rely on radio frequency communication in a specified range. Such wireless communications technologies provide for small form-factor, low-cost radio solutions that provide links between mobile PCs such as laptops; mobile or cellular phones; and other portable handheld devices such as PDAs; and allow for connectivity to the Internet and other networks.

Further, such wireless communications technologies allow for wireless personal area networks (WPAN) to be created with and between roaming wireless devices. For example, as a wireless device enters a WPAN or WLAN that is enabled with IEEE 802.11, 802.11(b) or 802.11 (a), Bluetooth™, or similar wireless technology, the wireless device may become part of the WPAN or WLAN. The wireless device is then able to communicate with other devices. Devices are advised of other devices, peripherals, and connections that are available on the particular network.

In a typical scenario with a desktop PC within a WPAN, the user of the desktop PC may be made aware of devices that are in the WPAN. As a wireless mobile device enters the WPAN, the user may desire to be made aware of the presence of the wireless mobile device entering the WPAN. Generally, wireless-technology-enabled devices, automatically advise all other devices of their presence as they enter a zone in which they are able to connect to the WPAN. With the growing use of wireless connectivity technology in portable devices such as PDAs and cellular telephones, whenever a user carrying such a device enters the connectivity zone of the user WPAN, the user is made aware of the presence of the device causing non-solicited interruptions. To lock out all passing wireless technology devices that enter the zone of the user WPAN would exclude communicating with devices that the user desires to connect to.

SUMMARY OF THE INVENTION

What is needed and is disclosed herein is an invention that provides for a method and a system to automatically determine whether two wireless devices are to be connected to one another, despite of the fact that connection authentication has been provided, wherein connection authentication includes proper identification or protocols between the two wireless devices.

In one embodiment of the invention, connection authentication is established, signal strength is measured and compared to predetermined signal strength value. Also signal rate change is measured and compared to a predetermined signal rate change value. If authentication is proper and signal strength and signal rate change values are met, then a connection is established between the devices.

Other embodiments of the invention include having one of the wireless devices perform measurement and comparison to predetermined values. In the measuring and comparing wireless device resides an RF radio transceiver that senses received signal strength from the other wireless device. Samples can be taken of the signal strength over time to determine rate of change.

In certain embodiments a base-band circuit in the measuring and comparing device performs the actual comparison or calculation of the received signal versus predetermined values. Predetermined values can be stored in a memory, where the memory is either part of or coupled to the base-band circuit.

In other embodiments an information handling system includes a wireless device that receives signal strength and signal rate change information from a second wireless device. An RF radio transceiver of the information handling system measures the received signal information and a base-band circuit compares the signal information against set parameters. Connection is made between the information handling system and the second device if the set parameters are met.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

Figure 1:
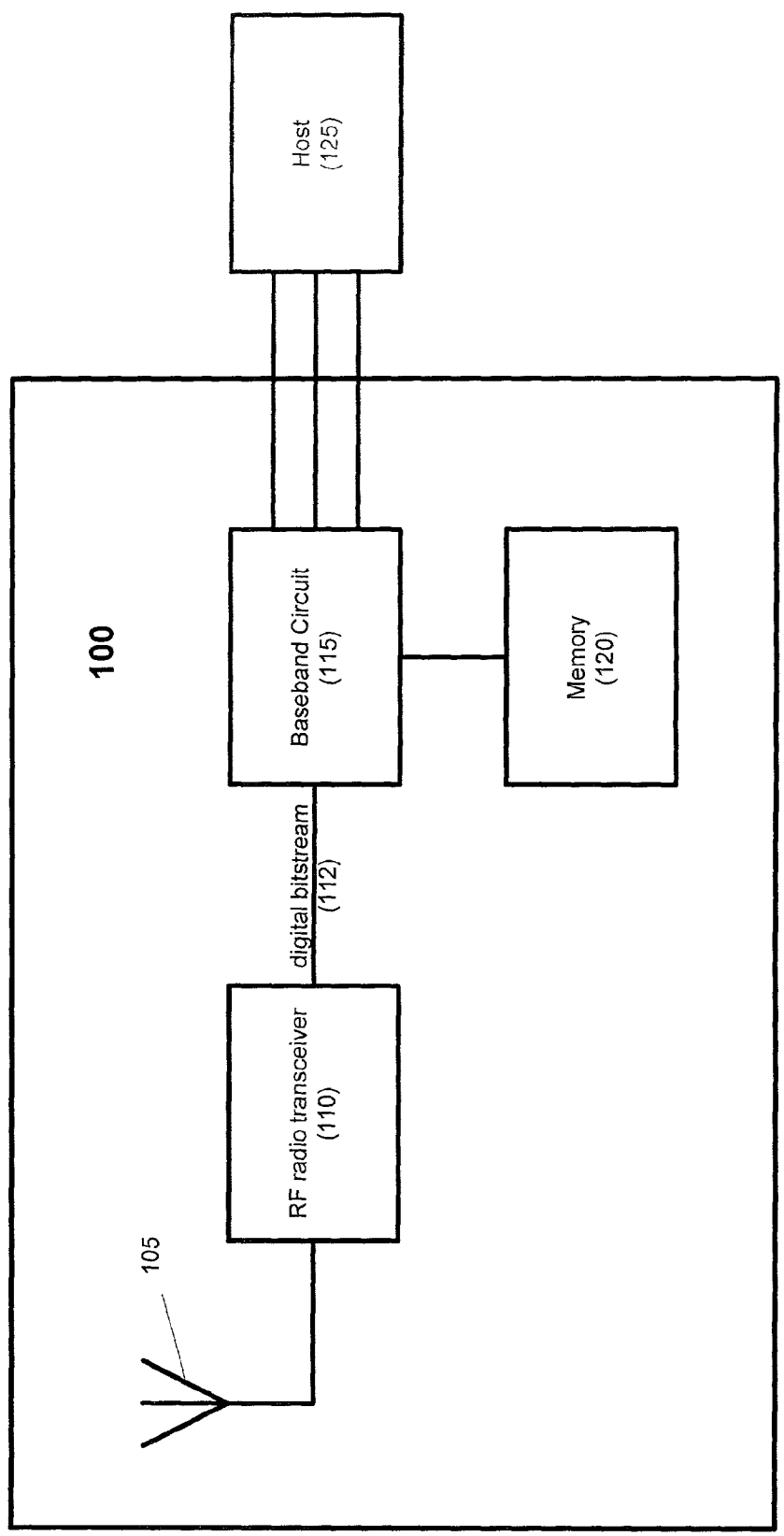
FIG. 1 is a block diagram illustrating wireless communication device architecture.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

Introduction

In a wireless personal area network, the proximity and the rate in which a device enters and travels within a zone of an information handling device may be used to determine whether the device is to connect with a desktop PC or similar information handling device.

Wireless Device Architecture

Referring to FIG. 1 is a block diagram illustrating wireless communication device architecture. Wireless or radio communication to and firm devices is provided by a system 100. System 100 may be internally integrated or part of an external added unit to devices. System 100 includes antennae 105 for reception and transmission. Antennae 105 is connected to RF radio transceiver 110. RF radio transceiver 110 may include various processing filters, amplifiers, analog circuitry, and analog to digital converters, to convert received analog signals to a digital bit stream 112 of information. Other aspects of RF radio transceiver 110 may include transforming the received signal (e.g., 2.4 GHz as used by the 802.11(b) and Bluetooth™ standards), to a more manageable frequency such as 20 MHz. It is noted that the any RF-based wireless technology may be used with embodiments of the present invention. By way of example and not limitation, such technologies include IEEE 802.11 (a), IEEE 802.11(b), IEEE 802.11(g), the Bluetooth™ standard and the HiperLAN2 standard.

RF radio transceiver 110 is also used to transmit digital bit stream 112 information to analog transmission, converting the digital signals of the digital bit stream 112 to analog signals transmitted by antennae 105. Digital bit stream 112 data is passed to and from RF radio transceiver 110 and base-band circuit 115. Base-band circuit 115 may include a microprocessor to process digital information, in particular digital bit stream 112.

RF radio transceiver 110 may receive and detect signals over a wide range of power levels. Generally, as devices move relative to one another, the detected power levels may change. Power level threshold values which determine connection may be placed in a buffer memory of base-band circuit 115. Depending on the specific hardware implementation buffer memory may be a part of base-band circuit 115, or may be memory 120, which directly interfaces to base-band circuit 115.

It is well known in the art that wireless technologies such as those related to cellular telephones have established protocols and arrangements that provide for the measurement of power levels and the transitioning from a device to device based on power levels. Power levels are indicative of the level of strength of received transmission from antennae 105. Base-band processor 115 is able to process power levels and make selective decisions based on power levels. Conversion to distances from equivalent power level measurements may also be performed by microprocessor 115. Microprocessor 115 is also able to continuously sample various power level readings and if necessary store such information in memory 120 (or buffer memory in base-band circuit 115). The present invention contemplates the use of any of the various methods and techniques to translate power levels into distances, and the invention is not limited to any particular method or technique.

Memory 120 may also be used to provide instructions to base-band circuit 115. Base-band circuit 115 may be programmed to selectively send and receive messages as predetermined by specified metrics or conditions. Specified metrics or conditions may include signal strength, fluctuations in signal strength, and rate of fluctuations of received signals. Host 125 may include one of various types of devices such as a desktop PC, a laptop PC, a PDA, a cellular phone, and a peripheral device such as a printer.

Connection within a WPAN

Figure 2:
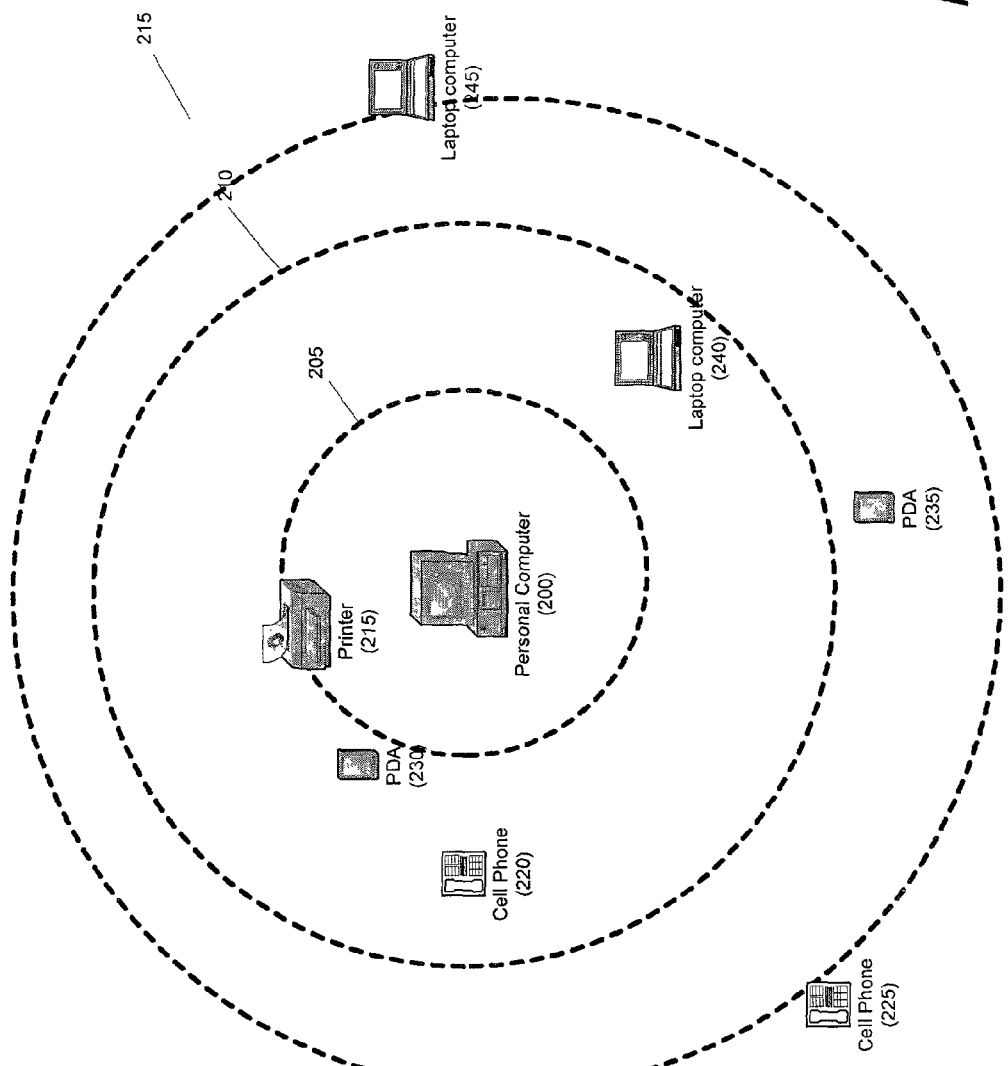
FIG. 2 is a diagram illustrating a wireless personal area network (WPAN) architecture.

Now referring to FIG. 2, a diagram illustrates a wireless personal area network (WPAN) architecture. A device with wireless connection capability, such as desktop PC 200, establishes a WPAN by connecting to one or a various number of devices incorporating the same wireless communication standard such as Bluetooth™. Connectivity of desktop PC 200 may take place from various distances from a relatively close distance as illustrated by perimeter 205, to an intermediate distance illustrated by perimeter 210, and to a longer distance illustrated by perimeter 215.

Desktop PC 200's WPAN may include dedicated devices that never leave the WPAN, devices such as printer 215. Desktop PC 200; however, is expected to encounter transitory or roaming wireless devices that will attempt to connect to desktop PC 200. These devices may include other peripherals such as portable printers, cell phones, personal digital assistants (PDA), or laptop PCs. In this particular example, FIG. 2 illustrates several roaming wireless devices, specifically cell phones 220 and 225; PDAs 230 and 235; and laptop PCs 240 and 245.

Wireless technology standards provide protocols that account for identification of wireless devices to one another. Only wireless devices that are properly authenticated will be able to connect to other wireless devices. This allows for discrimination standards or connection authentication to be put in placed that distinguishes devices that may be connected and devices that are disallowed on the WPAN. Therefore management information system (MIS) administrators may configure wireless devices to connect only to other properly identified wireless devices. In a large institution; however, identification requirements are made broad based to allow a great number of institutional wireless devices to connect to one another. Often times this may mean that a transitory device such as cell phone 220, PDA 230, or laptop 240 that is merely passing by desktop PC 200 will connect to desktop PC 200's WPAN.

In this particular example, desktop PC 200 desires to connect to transitory wireless devices such as cell phone 225, PDA 235, and laptop 245. If cell phone 225, PDA 235, and laptop 245 have the proper identification and protocol setup, connection will be made to desktop PC 200. It is desirable; however, to discriminate from other devices that have the proper identification and protocol, but are not desired to be connected to the WPAN of desktop PC 200. Devices such as cell phone 220, PDA 230, and laptop 240 may cause an undesirable interrupt connection to desktop PC 200. Common expected cases of undesirable interruptions include situations when individuals carrying a device such as cell phone 225 merely walks by desktop PC 200 causing an unintended connection to the WPAN of desktop PC 200.

RF radio transceiver 110 is able to differentiate between various rates and fluctuations of received signal strength. As roaming wireless devices such as cell phone 220, PDA 230, and laptop 240 travel in, through, and out of the connectivity perimeters 205, 210, and 215 surrounding desktop PC 200, certain rates and/or fluctuations are seen based on signal strength between the devices and desktop PC 200. Within base-band processor 115 or memory 120 may be set parameters that may relate which threshold values of signal strength, rate of change of signals, or derived parameters that will allow desired connection or prevent unwanted connection. Parameters may be set on the presumption that great rate changes and relatively longer distances will translate to devices that are not desired to be connected to desktop PC 200.

Measurement of Distance of or Fluctuation of Signal

Conversion to signal fluctuation or distance between wireless devices may be calculated using various known methods. A particular method includes the use of the following mathematical equation that describes free space path loss:

$$L_p(dB)=32.45+20 \log(freq_{(Mhz)})+20 \log(dis_{(Km)})$$

Loss in power ($L_p$) measured in decibels is equal to a constant of 32.45 plus the log of operating frequency (freq) in megahertz times twenty plus the log of distance (dis) between the two devices in kilometers times 20.

The equation describing total loss between devices is as follows.

$$\text{Total Loss}=L_p(dB)-\text{Gain}_{rec}(dB)-\text{Gain}_{trans}(dB)$$

Total loss equals the loss in power minus the gain of a receiver device ($\text{Gain}_{rec}$) minus the gain of the transmitting device ($\text{Gain}_{trans}$).

In wireless communication technology such as IEEE 802.11(b) or Bluetooth™, the operating frequency is fixed to 2.4 GHz. The value 20 $\log(freq_{(Mhz)})$ therefore may be treated as a constant. In considering relative changes and drops in power loss, the loss in power equation simplifies to an approximation that loss in power is directly related to $20\log(dis_{(Km)})$ In other words a loss in power is related to distance. To determine rapidly changing or fluctuating signals, loss in power may be measured (sampled) between two devices over a period of time at set interval time periods. If the loss of power difference between sample time periods exceeds a predetermined value, the derived fluctuation is indicative of a situation where connection is not expected. A predetermined value for instance may be a value that relates to a typical walking rate of speed.

A weak or faded signal translates into a relatively long distance between devices. To determine correlating distance to loss of power, the total loss of power equation that includes gains of receiver and transmitter devices is used. A specific loss as measured in decibels translates to a specific signal strength. Since devices transmit at a regulated or predetermined power level, changes or differences in loss translate to distance. Predetermined values may be set to correlate threshold connection distances to signal strength.

Flowchart Regarding Connection Decision

Figure 3:
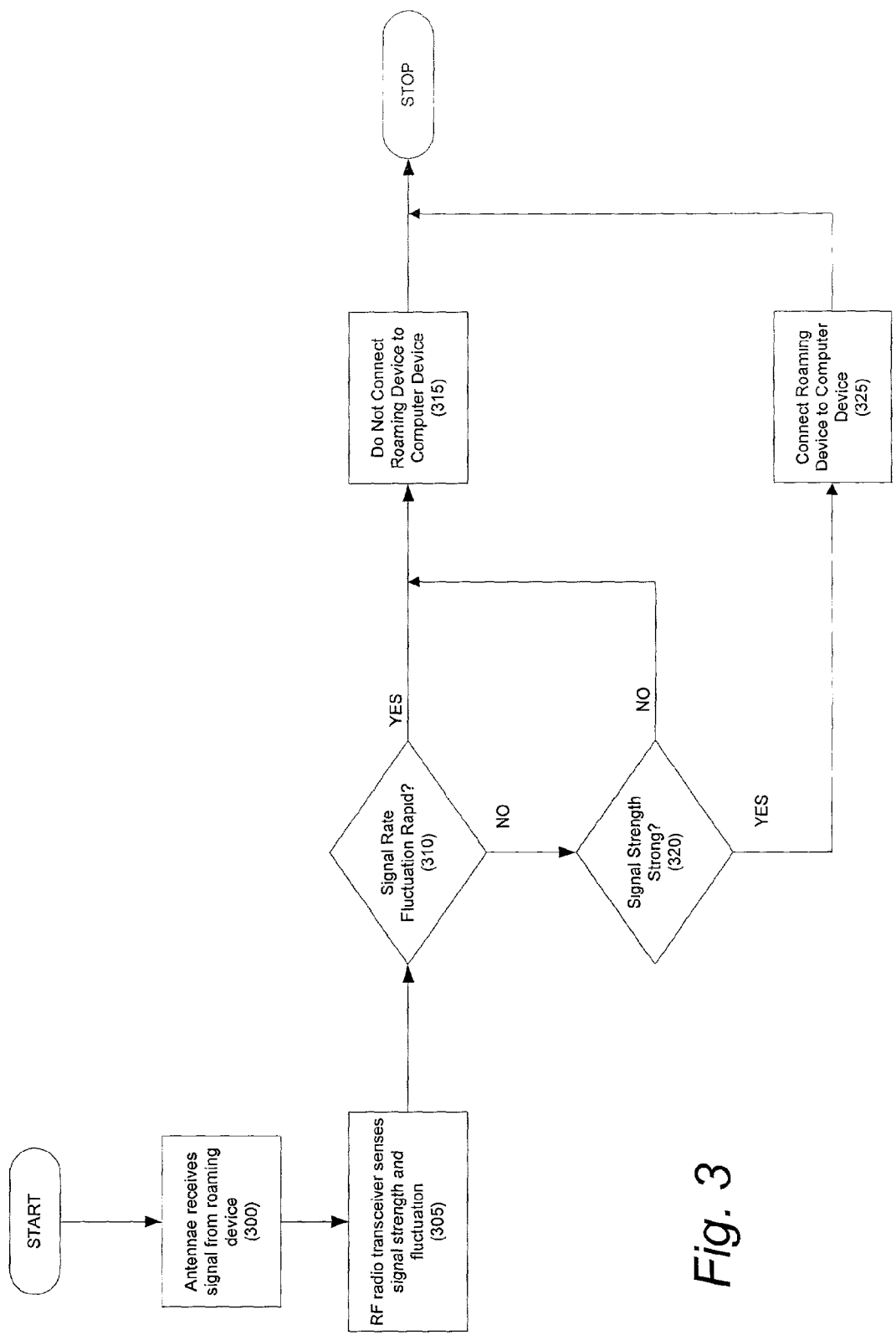
FIG. 3 is a flowchart that determines connection to a device.

Now referring to FIG. 3, a flow chart illustrates connection to roaming device. As a roaming device with wireless communication technology approaches another device such as a desktop PC 200, the roaming device transmits radio frequency signals that are picked up by the antennae 105 of the desktop PC 200, step 300. RF radio transceiver 110 senses the strength and fluctuation of the signals that antennae 105 is picking up, step 305.

Before connections are established, data typically is exchanged between devices or a base device such as desktop PC 200 and a roaming device. If power levels are measured and processed, decision may be made to accept or deny the connection between devices.

Drops in signal power as discussed may be used to determine correlated changes affecting connection or denial of connection. Step 310 determines the rate of fluctuation of the transitory device. If the fluctuation rate is great, no connection is made to the roaming device, step 315. If the drop or rise in signal strength is relatively low, a measurement of the signal strength is made, step 320. A strong signal is generally indicative of a roaming device that is close to the desktop PC and thereby may be more likely intended to be connected to the desktop PC. If the signal strength is strong a connection is made, step 325. If the signal strength is weak, although no signal rate fluctuation is low, the conditions are generally indicative of a roaming device that is far from the desktop PC. These conditions indicate a more likely possibility that connection is not intended, and no connection is made, step 315.

The prespecified threshold values for the minimum signal fluctuation and strength may be varied to take into account several factors including, without limitation, characteristics of the environment, nuances of the application(s), and nuances of the wireless technology.

Although the present invention have been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A method for discriminating connection between a first wireless device and a second wireless device comprising:
    establishing a predetermined connection authentication between the first wireless device and the second wireless device;
    measuring signal strength of the first device;
    comparing the signal strength to a predetermined signal strength threshold value;
    measuring signal rate change of the first device;
    comparing the signal rate change to a predetermined signal rate change threshold value; and
    connecting the first device to the second device if the predetermined connection authentication, signal strength threshold value, and signal rate change value are met; wherein
        the predetermined signal strength threshold value correlates to a predetermined distance between the first wireless device and the second wireless device; and the predetermined signal rate change threshold value correlates to a predetermined distance rate change between the first wireless device and the second wireless device.

2. The method for discriminating connection between a first wireless device and a second wireless device of claim 1 wherein measuring signal strength and signal rate change are performed by the second wireless device.

3. The method for discriminating connection between a first wireless device and a second wireless device of claim 2 wherein measuring signal strength and signal rate change are performed by the second wireless device.

4. The method for discriminating connection between a first wireless device and a second wireless device of claim 2 wherein the predetermined signal strength threshold value and the predetermined signal rate change threshold value are stored in a memory in the second wireless device.

5. The method for discriminating connection between a first wireless device and a second wireless device of claim 3 wherein the predetermined signal strength threshold value and the predetermined signal rate change threshold value are stored in a memory in the second wireless device.

6. The method for discriminating connection between a first wireless device and a second wireless device of claim 1 wherein measuring signal strength and signal rate change are performed by the second wireless device.

7. The method for discriminating connection between a first wireless device and a second wireless device of claim 6 wherein measuring signal strength and signal rate change are performed by an RF radio transceiver of the second wireless device.

8. The method for discriminating connection between a first wireless device and a second wireless device of claim 3 wherein the predetermined signal strength threshold value and the predetermined signal rate change threshold value are stored in a memory in the second wireless device.

9. The method for discriminating connection between a first wireless device and a second wireless device of claim 3 wherein the predetermined signal strength threshold value and the predetermined signal rate change threshold value are stored in a memory in the second wireless device.

10. An information handling system including a wireless device that receives signals from a second wireless device wherein the signals convey a signal strength and a signal rate change, comprising:

an RF radio transceiver capable of measuring the signal strength and the signal rate change of the second wireless device; and a base-band circuit capable of comparing the signal strength to a predetermined signal strength threshold value and comparing the signal rate change to a predetermined signal rate change threshold value; wherein the information handling system is operable to a connection to the second wireless device if the predetermined signal strength threshold value, and the predetermined signal rate change threshold value are met; and wherein the predetermined signal strength threshold value correlates to a predetermined distance between the wireless information handling system first and the second wireless device; and the predetermined signal rate change threshold value correlates to a predetermined distance rate change between the wireless information handling device and the second wireless device.

11. The information handling system of claim 10 further comprising:

a memory operable to store the predetermined signal strength threshold value and the predetermined signal rate change threshold value.

12. The information handling system of claim 11 wherein the memory is coupled to the base-band circuit.

13. The information handling system of claim 11 wherein the memory is coupled to the RF radio transceiver.

14. The information handling system of claim 10 further comprising:

a memory operable to store the predetermined distance and the predetermined distance rate change.

15. The information handling system of claim 14 wherein the memory is coupled to the base-band circuit.

16. The information handling system of claim 14 wherein the memory is coupled to the RF radio transceiver.

* * * * *